Patented June 3, 1947

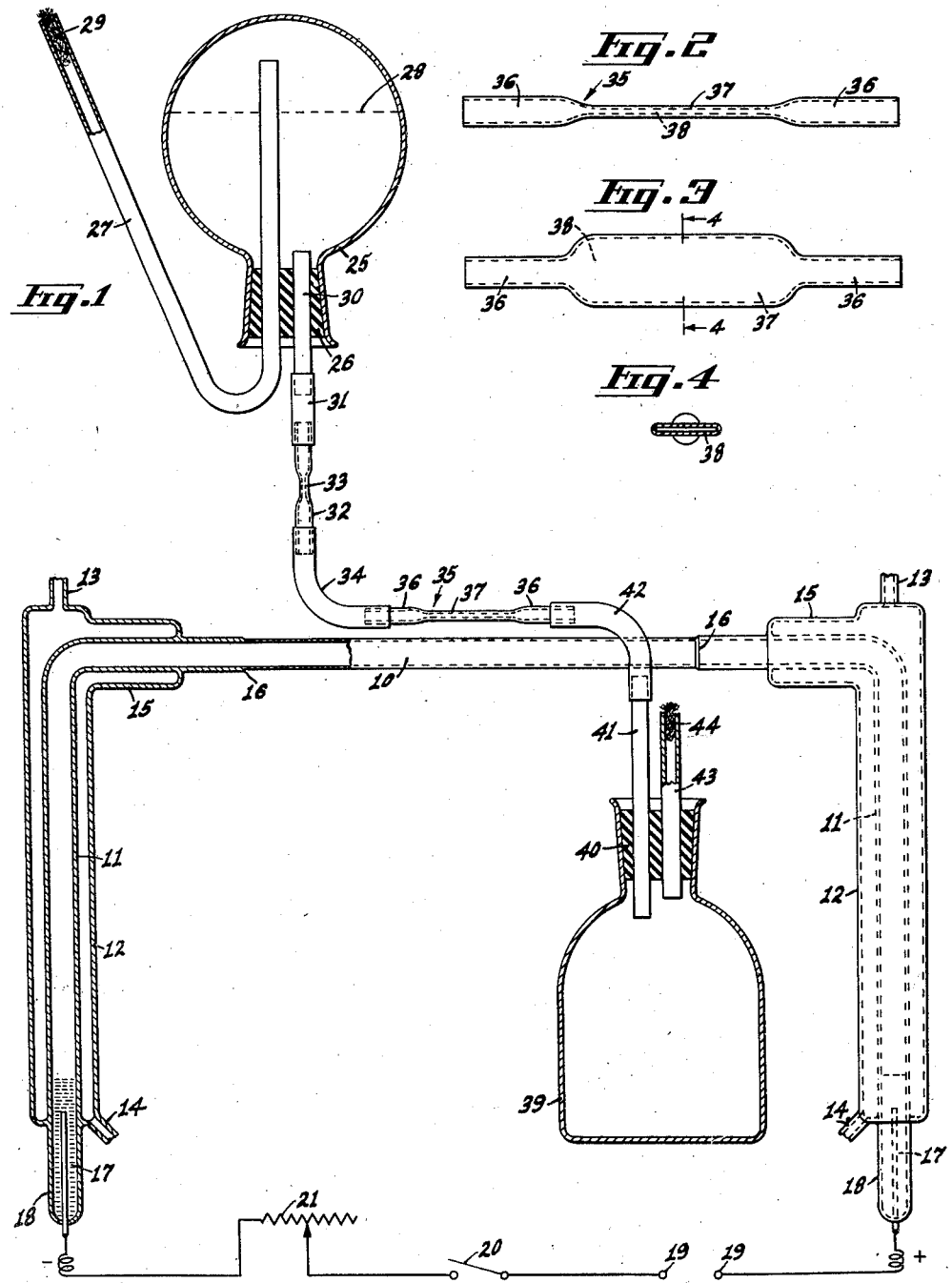

2,421,382

UNITED STATES PATENT OFFICE 2,421,382

VACCINES AND ANTIGENS AND METHOD OF PRODUCING THE SAME

Sidney O. Levinson and Franz Oppenheimer, Chicago, Ill., assignors to Michael Reese Research Foundation, Chicago, Ill., a nonprofit corporation of Illinois Application March 6, 1946, Serial No. 652,440

15 Claims. (Cl. 167—78)

This invention relates to improvements in vaccines and to a method of producing vaccines. By means of the present invention, we are able to produce known vaccines of increased potency, and are able to produce vaccines for certain diseases for which satisfactory vaccines have not heretofore been produced.

A vaccine is usually defined as a suspension of killed or attenuated micro-organisms. While a suspension of living micro-organisms or other infectious material has the ability to produce antibodies in an animal or person on which it is used, the use of living unattenuated micro-organisms in a vaccine is accompanied by the danger of producing disease in the animal or person to whom such living vaccine is given. Likewise the use of living attenuated vaccines is not without danger because of the possibility that the micro-organisms contained therein may suddenly regain their disease producing qualities. The present invention relates to the killed or inactivated type of vaccine. This type of vaccine is generally harmless when properly administered and its value depends entirely on its ability to produce antibodies and therefore develop an immunity in the animal or person on which it is used.

The vaccines now generally employed are prepared by one of two methods. The heat killed vaccines are produced by heating the suspension containing the living micro-organisms to their thermo-lethal point for the required time. These vaccines are fairly efficacious in some instances, in prevention of disease in man; as for example, the typhoid fever vaccine. The effect of the heating, however, besides killing, is to denature the chemical structure of constituent parts of the micro-organism and thus materially affect its antigenic (antibody-producing) properties as a result of which its ability to produce antibodies is greatly reduced. Thus, in many instances, a killed or inactivated vaccine produced by heating is of very little or no value in producing immunity against the disease for which it is used.

A second method of producing vaccines in common use is by chemical inactivation of a living culture. The chemicals commonly used to inactivate various bacteria, viruses or other infectious material are phenol, merthiolate, formalin and chloroform. An example of a vaccine of this type is the rabies vaccine which is generally inactivated by adding 1 percent of phenol to an 8 percent infected brain tissue suspension. On the basis of animal tests, the rabies vaccine is regarded as a relatively poor vaccine and its keeping qualities are limited by the progressive deterioration of the antigens caused by the phenol.

Efforts have been made to inactivate suspensions of bacteria or viruses by radiation with ultra violet light, such as is produced by the quartz mercury arc, or cold quartz lamp. While experiments heretofore conducted have shown that viruses and bacteria can be inactivated by ultra violet light, the results of such experiments are that the vaccines so produced have been no better than the heat or chemical killed vaccines, and the results of such methods have not been consistent. In attempts to irradiate suspensions of micro-organisms by use of ultra violet radiation, the methods employed have required exposure for such long periods of time (9 minutes to 4 hours with an average time of 25 to 45 minutes) that the antigenic properties of the organisms have been impaired or destroyed. Over exposure of the organisms to ultra violet light results in the destruction of the antigenic properties of the vaccines. Use of the quartz mercury lamp for irradiating vaccines has resulted in a pretty general conclusion that the organisms are denatured before sterilization of the micro-organisms is obtained. If the antigens present in the micro-organism are altered, their faculty to produce antibodies in man is generally impaired.

While the results heretofore obtained by irradiating suspensions of viruses or bacteria with a quartz mercury arc or cold quartz lamp have not resulted in an increase in the potency or antigenic properties of the vaccine, we have found that highly improved results can be obtained by our new and controlled technique of irradiation by which inactivation of the organisms is produced without materially affecting their antigenic properties. Our method thus results in the production of potent vaccines and also gives consistently good and uniform results each time suspensions are submitted to the treatment. It has been determined that a minimum of 5 to 10 milliwatt seconds per square centimeter of energy of the wave length 2537 Å. is required to produce adequate killing of micro-organisms (Acceptance of ultra violet lamps for disinfecting purposes, Journal of the American Medical Association, January 24, 1942, page 298).

The principles which govern the action of ultraviolet on micro-organisms for vaccine production are as follows:

1. A definite amount of ultraviolet energy per time unit is required to kill the infectious agent.
2. Ultraviolet, especially in the Schuman range, is readily absorbed in clear aqueous solutions and has limited penetration, particularly in turbid fluids containing organic matter.

3. The ultraviolet energy must reach and be absorbed by the infectious agent to exert a lethal effect.

4. Over-irradiation rapidly destroys the antigenic properties of an infectious agent.

Our invention provides the means for the first time for producing vaccines completely killed with minimum denaturation by very rapid exposure of a thin film to powerful ultraviolet energy. In our invention we use a powerful source of ultraviolet which, besides strong emission in the far ultraviolet (2600 Å.–2000Å.), emits light in the Schuman range, so that inactivation is accomplished very rapidly. In practicing the invention we preferably employ a specially designed ultraviolet permeable irradiation chamber to produce a rapidly flowing, uniform film of a suspension of micro-organisms which can be made as thin as 0.1 mm. Previous practice had employed stationary layers of suspensions of microorganisms in dishes or a column of fluid through a straight or spiral tube, depending on turbulence, to expose all parts of the suspension. The exposure of suspensions in dishes as described required very long exposures (fifteen to ninety minutes), so that it not only is commercially impractical because the quantity of vaccine is very small, but there is so much over-exposure that the quality of vaccine is poor. With the use of suspensions in tubes there were also very long exposures (fifteen minutes to four hours), the method was unreliable and incapable of standardization, so that no consistent product resulted, and often the vaccine was of no value due to the over-irradiation which occured. Our combination of an ultraviolet light source of sufficient intensity and a thin, uniform film of a suspension of micro-organisms enables us to inactivate the organisms with the least amount of energy required for such inactivation, thereby avoiding deteriorating effects from over-irradiation. This procedure can be standardized and is constant and reproducible. Furthermore, this combination of powerful ultraviolet and rapidly flowing suspension yields large quantities of vaccine, sufficiently large for commercial production. For example, one large biological concern distributes ten liters of human rabies vaccine and sixty liters of veterinary rabies vaccine per week. With one lamp and four irradiation chambers as an operating unit we can irradiate ten liters of rabies vaccine per hour. An entire week's supply of rabies vaccine can thus be produced in seven hours' irradiation with a single lamp unit.

In the practice of our invention, it is possible to produce an inactivated potent vaccine by using a uniform film thickness of not over 3 mm., with a light source emitting no less than ten milliwatts per centimeter of energy in the range of 2537 Å., in as short an exposure time as ten seconds. However, if the energy is more powerful, the film thinner and the exposure shorter, the vaccine will be more potent and the quantity will be greater. We prefer, therefore, to use a flowing film of no more than 0.2 mm. in thickness, and a lamp described below which has an ultraviolet output of 50 milliwatts per square centimeter, measured at 1 centimeter distance, of which 40 milliwatts (80%) of the energy irradiated are between 2000 Å. and 2600 Å., 5 milliwatts (10%) are above 2600 Å., and 5 milliwatts (10%) are below 2000 Å., that is, in the 1849 Å. and 1942 Å. spectral bands. Under these conditions the same vaccine will be inactivated much more rapidly, i. e., in less than one second.

The time of exposure necessary to completely kill bacteria or viruses is also governed by the turbidity of the suspension. Whereas suspensions of one billion B. coli or four percent brain tissue are sterilized in 0.1 to 0.3 second, heavier suspensions require longer periods of irradiation. We have found that dense suspensions of B. pertusses containing eighteen billion organisms per cubic centimeter require two seconds' exposure to this lamp in a film thickness of 0.1 mm. Canine rabies vaccine, which requires twenty percent brain tissue suspension, is very turbid and quite opaque to ultraviolet radiation. It requires, therefore, two to four seconds' exposure in a 0.1 film thickness for inactivation. The time can be somewhat shortened by passing the suspension through two to four irradiation chambers arranged serially. Equine encephalomyelitis vaccine is prepared from a 33⅓ percent chick embryo suspension. This material is not only very dense but highly infective and requires up to five seconds' exposure in a 0.1 mm. film for complete inactivation. Infected hog cholera blood, which is very opaque, may require up to ten seconds' exposure for complete sterilization.

Although it is preferable to irradiate ultraviolet transparent suspension, the industry at present finds it necessary to work with suspensions of varying turbidity and concentrations. In the practice of our invention we establish by an "irradiation titration" the minimum time necessary to inactivate a given suspension of the microorganisms. This minimal irradiation inactivation time is increased for production operation to provide a margin of safety. The destruction of the antigenic properties of micro-organisms by ultraviolet light is a progressive process, the rapidity of such destruction depending upon the intensity and wave length of the radiation. Obviously, the shortest exposure to produce complete sterilization or inactivation will least affect the antigenic properties. Some antigens are relatively stable to the effect of ultraviolet, so that overexposure will still yield a fairly effective vaccine. Therefore, while a suspension of four percent infected rabies brain can be completely inactivated with this lamp in a 0.2 mm. film in 0.3 second's exposure, resulting in a vaccine of very high potency (affording protection against 100,000 M. L. D.), an over-exposure of three seconds under otherwise identical conditions will still produce an acceptable vaccine, although the potency will be greatly reduced (e. g., protection against 5,000 M. L. D.).

Vaccines prepared repeatedly in commercial quantities under the preferred conditions described above, when tested by standard methods such as immunization of mice, and compared with vaccines prepared with phenol or other usual means, have an immunizing value many times greater than the current vaccines and in some instances appear to be equal to a vaccination from live organisms.

In the accompanying drawings we have illustrated an organization of apparatus elements suitable for use in practicing the process and in particular disclosing the lamp described wherein appreciable amounts of irradiation below 2000 Å. is obtained. In this showing, Fig. 1 is an elevation of apparatus for feeding the vaccine suspension to a cell to irradiate it;

Fig. 2 is a side elevation of the cell whereby a thin film of the vaccine is exposed;

Fig. 3 is a top plan view thereof; and

Fig. 4 is a transverse, vertical, sectional view on line 4—4 of Fig. 3.

As stated, in carrying out the invention, the suspension of micro-organisms is submitted to irradiation of a light source of intense ultraviolet energy in a continuous flowing thin film. There are certain major variables which must be standardized and kept constant in order to achieve substantially complete killing of the organisms with a minimum impairment of the antigenic properties. They are (1) ultraviolet energy, (2) thickness of film of organisms, (3) turbidity of suspension, (4) time of exposure. These variables are connected and correlated. Thus, the less the ultraviolet energy imparted to the suspension, the longer the irradiation time required for killing. If the solution is more turbid the film must be thinner. If the film is thicker and/or more turbid, the time must be lengthened, if the ultraviolet energy source remains constant. With our invention these variables are adjustable and can be correlated. Thus, complete killing can be effected in as short as ten seconds with a film thickness of not over 3 mm. when the solution is relatively clear. It is preferable, however, to perform the operation in as short a time as possible, one second, with a film thickness of less than 0.5 mm.

In Fig. 1 of the drawings we have illustrated a lamp capable of producing an appreciable amount (10%) of energy below 2000 Å. by means of which vaccines may be irradiated. The lamp illustrated, of the dimensions herein set forth, has been used with very good results. As shown, the lamp may be of an inverted U-shape consisting of a base portion 10 made of high-grade optical quartz and having a thickness of substantially 0.5 mm. In a specific embodiment this leg 10 has an inside diameter of 1 cm. and a length of 16 cm. The section 10 of the lamp is connected to legs 11 which may be made of commercial quartz and which are of an over-all length of about 15 cm. Each of these legs is provided with a water jacket 12 having an outlet 13 at its highest point and an inlet 14 at its lowest point. As shown, the water jacket is provided with an extension 15 covering a portion of the base of the lamp and just beyond the end of the water jacket the commercial quartz forming the leg 11 is joined to the high-grade optical quartz forming the base 10 by suitable seal 16. A pool of mercury 17 is arranged in a bulb or extension 18 which projects beyond the water jacket and which is preferably of a length of about 3 cm. The lamp is connected to terminals 19 of a supply circuit through a switch 20 and an adjustable resistance or reactance coil 21 arranged in series with it.

In building this lamp we use high-grade optical quartz and exercise the greatest possible precautions as to the purity of the quartz to obtain a structure which is highly permeable to radiations between 1500 Å. and 2000 Å. The lamp is prepared in the manner normally used in the manufacture of X-ray tubes by operating it for a few hours or more at high energy input while connected to a vacuum pump. It is also desirable that the lamp should be baked in a furnace while on the pump at 650° C., then washed out with an inert gas such as argon, before the mercury is admitted. The mercury employed should be free from gas and from all impurities including oxides. At the end of the exhaust period the lamp is sealed off in the usual way and is ready for use.

The lamp is operated at a low mercury vapor pressure, about 20 microns and not exceeding 50 microns. The cooling jackets 12 are employed for this purpose and water at a temperature of about 50° F. is delivered through the jackets from the inlets 14 to the outlets 13 while the lamp is in operation. To overcome the difficulty of starting a lamp at such low pressure, we heat the mercury, apply the voltage across the terminals and operate a high frequency coil outside the lamp. After starting, cold water is run through the chambers 12, manipulating the resistance 21 to maintain a constant current of about 5 amperes. When a steady condition is established with a current at 5 amperes and with a current of cold water running through the cooling chambers, the amperage may be increased to 15 amperes and the lamp is ready for use.

In treating the vaccine, the suspension is placed in a suitable container and delivered at a constant rate in close proximity to the leg 10 of the lamp. For the purpose of illustration we have shown flask 25 containing the suspension arranged at an elevation to permit controlled flow of the suspension by gravity. As shown, the mouth of the flask is closed by a rubber stopper 26. A tube 27 for the inlet of air passes through the stopper and has its end arranged above the level of the suspension indicated at 28. The end of the tube outside the flask is also arranged at an elevation and is filled with a packing 29 of cotton or other suitable material. An outlet tube 30 also extends through the rubber stopper and is connected to a flexible connector 31, such as a piece of rubber tubing. The flow of the vaccine suspension is controlled by a member 32 which, as shown, may consist of a capillary glass tube having a restricted portion 33. Any other controlling means may be employed. The other end of this tube is connected to a suitable connector 34 shown as rubber tubing, which is in turn connected to the cell 35 in which the radiation of the suspension takes place. The cell is shown in detail in Figs. 2 to 4 of the drawings. The cell is also formed of high-grade optical quartz readily permeable to wave lengths below 2000 Å. and consists of tubular end portions 36. The intermediate portion 37 of the cell is flattened forming a passage 38 through it of a thickness of about 0.1 mm. The thickness of the walls of the portion 37 of the cell should not exceed 0.5 mm. While the dimensions of the cell may vary, we have obtained good results with a cell in which the flattened portion 37 is of a width of 1 cm. and a length of about 10 cm.

From the cell 35 the treated suspension is delivered to a sealed flask 39 in which it is collected. As shown, the flask is provided with a rubber stopper 40 having a tube 41 extending therethrough and the end of this tube is connected to the adjacent end of the cell by a suitable connector, such as a piece of rubber tubing 42. A second tube 43 extends through the stopper 40 and is provided with a packing 44 of cotton or other suitable material.

The lamp above described, with an input of 500 watts produces 50 milliwatts of energy per square centimeter. By using an envelope impervious to radiations below 2000 Å. in place of the high optical quartz and measuring the output of the lamp, we have determined that substantially 5 milliwatts of the 50 milliwatt output is thus cut off, indicating that 10 percent of the energy is below 2000 Å. In a similar manner we have determined that substantially 10 percent of the energy of the lamp as above 2600 Å. and the remaining 40 milliwatts between 2000 and 2600 Å. The lamp with the energy below 2000 Å. cut-off produces sterilization and inactivation of the micro-organisms in a suspension in a treatment of not more than 10 seconds when exposed in a film not more than 1 millimeter thick. When the energy below 2000 Å. is present, as when the high grade optical quartz envelope 10 is employed, complete inactivation is secured in treatments less than 1 second in a film not more than 1 millimeter thick.

In repeated tests conducted with the lamp herein described and utilizing the wave lengths below 2000 Å., 100 percent of a suspension of *Bacterium coli* suspended in distilled water containing approximately 1 billion organisms per cubic centimeter has been completely sterilized in a treatment lasting 0.2 second at a distance of .5 to 1 cm. from the lamp and a film thickness of .2 mm. We ascribe our results to the emission of a considerable amount (10%) of energy in wave lengths below 2000 Å., the lamp being particularly strong in the 1849 and 1942 lines and our method of rapid total action on the entire suspension. These results have been obtained without affecting the antigenic properties of the organisms as will be later set forth.

We have also killed in 0.2 second *Eberthella typhi* (strain 58), *Salmonella enteritidis*, *Staphylococcus aureus* and pneumococcus, type 1. Irradiation for 0.4 second will inactivate a 4 percent suspension of the rabies and lymphocytic choriomeningitis viruses; 0.8 second will inactivate St. Louis encephalitis virus.

To determine the immunizing value of rabies vaccine produced according to applicants' invention as compared to standard vaccines now available, tests were carried out on Swiss mice weighing 13-15 grams and equally divided according to sex and weight. The mice were inoculated with .25 cc. of .5% rabbit brain emulsion of each vaccine intraperitencally every other day for six doses according to Habel's technique. The vaccine of the present invention was compared with a phenol-treated vaccine issued by the Department of Health of the State of Illinois. It was found that the end point for unvaccinated mice used as controls was a dilution of the challenge dose to a point between $10^{-7}$ and $10^{-8}$. For the mice inoculated with the phenol prepared vaccine, the end point was between $10^{-4}$ and $10^{-5}$, the vaccine thus amounting to protection against 1000 lethal doses. With the mice inoculated by applicants' vaccine, the end point was a dilution between $10^{-2}$ and $10^{-3}$, the vaccine thus having the effect of protection against 100,000 lethal doses.

The suspensions so treated are also greatly improved for use as antigens in complement-fixation tests for diagnosis. Quite frequently tests of this type are not used because of the risk involved in handling the living antigens formerly required in these tests. Antigens inactivated by chemicals, such as formalin, or by heating have not proved satisfactory. We have found that satisfactory lymphocytic choriomeningitis complement-fixing antigens can be prepared by our method. These antigens are safe because they are inactivated by the treatment. They are non-infectious, non-anti-complementary and highly specific and are as potent an antigen as the original living virus suspension before irradiation.

The activity of such antigens was compared to the activity of the antigens prepared by heating and also to that of living antigens and it was found that the irradiated antigen and the living antigen were not anti-complementary while formalized antigen was. All antigens were diluted 1 to 100 and results obtained representing highest dilution of serum gave fixation.

In this specification we have referred to vaccines as suspensions of micro-organisms. It is well known that certain micro-organisms elaborate toxins, known as exotoxins or contain certain toxins known as endotoxins. These toxins may produce severe reactions, and to make an acceptable vaccine, it is necessary to modify or de-toxify the vaccine. Whereas the organisms in certain suspensions may be completely killed in a fraction of a second, the toxins accompanying these organisms may require a 10 fold greater exposure to become de-toxified. For example, a suspension containing 1,000,000,000 Shiga dysentery organisms can be sterilized by an exposure of 0.2 second in a film thickness of 0.1 mm. This material is still toxic and produces severe reactions and death when injected into mice. If the irradiation is increased to 4 seconds, the vaccine becomes de-toxified and is inocuous when injected into mice. This additional exposure does not materially affect its antigenicity. When the phrase "to inactivate the organisms" is used in the claims, it is intended to include the detoxification of toxins when the organism is of a type that toxins are present.

As herein set forth, the values given are for optimum results and may be varied beyond the limits stated while still obtaining some of the benefits of the process and with the production of acceptable vaccines according to the minimum requirements of present standard. Such practice is considered to be within the scope of the invention as set forth in the appended claims.

This application is a continuation in part of our copending application Serial No. 491,568, filed June 19, 1943.

We claim:

1. The method of treating a suspension of micro-organisms to inactivate the organisms without materially impairing the antigenic properties of the suspension which comprises exposing the suspension to ultraviolet irradiation for a period of time sufficient to inactivate the organisms and not over one second in a film not over 1 mm. thick in which the irradiated energy below 2000 Å. is not less than 0.1 milliwatt per square centimeter.

2. The method of treating a suspension of micro-organisms to inactivate the organisms without materially impairing the antigenic properties of the suspension which comprises exposing the suspension to ultraviolet irradiation for a period of time sufficient to inactivate the organisms and not more than three seconds in a film of not more than 3 mm. thickness in which the irradiated energy between 2000 Å. and 2600 Å. is not less than 1.0 milliwatt per square centimeter.

3. The method of treating a suspension of micro-organisms to inactivate the organisms without materially impairing the antigenic properties of the suspension which comprises exposing the suspension to ultraviolet irradiation for a period of time sufficient to inactivate the organisms and not over 0.1 second in a film not more than 1 mm. thick in which the irradiated energy between 2000 Å. and 2600 Å. is not less than 1.0 milliwatt per square centimeter, and the irradiated energy below 2000 Å. is not less than 0.1 milliwatt per square centimeter.

4. The method of treating a suspension of micro-organisms to inactivate the organisms without materially impairing the antigenic properties of the suspension which comprises exposing the suspension to ultraviolet irradiation for a period of time sufficient to inactivate the organisms and less than 1 second in a film not over 1 mm. thick from a lamp in which approximately 10 percent of the ultraviolet energy irradiated is below 2000 Å. and in which the ultraviolet output of the lamp is not less than 1.1 milliwatts per square centimeter.

5. The method of treating a suspension of micro-organisms to inactivate the organisms without materially impairing the antigenic properties of the suspension which comprises exposing the suspension to ultraviolet irradiation for a period of time sufficient to inactivate the organisms and not over 1 second in a film not over 1 mm. thick from a lamp in which approximately 10 percent of the ultraviolet energy irradiated is below 2000 Å. and approximately 10 percent of the energy irradiated is above 2600 Å. and in which the ultraviolet output of the lamp is not less than 1.1 milliwatts per square centimeter.

6. A vaccine of high potency having antigenic properties substantially equal to those of an untreated suspension of the organisms comprising a sterile suspension of organisms which has been subjected to ultraviolet irradiation for a period of less than 1 second by a lamp having an ultraviolet output of not less than 1.0 milliwatt per square centimeter of energy between 2000 Å. and 2600 Å. and not less than 0.1 milliwatt per square centimeter of energy below 2000 Å.

7. A vaccine of high potency having antigenic properties substantially equal to those of an untreated suspension of the organisms comprising a sterile suspension of organisms which has been subjected to ultraviolet irradiation for a period of less than 1 second by a lamp having an output of not less than 0.1 milliwatt per square centimeter of energy below 2000 Å.

8. A vaccine of high potency having antigenic properties substantially equal to those of an untreated suspension of the organisms comprising a sterile suspension of organisms which has been subjected to ultraviolet irradiation for a period of less than 3 seconds by a lamp having an output of not less than 1.0 milliwatt per square centimeter of energy between 2000 Å. and 2600 Å.

9. The method of treating a suspension of micro-organisms to inactivate the organisms without materially impairing the antigenic properties of the organisms, which comprises exposing the suspension to ultraviolet irradiation for a period of time sufficient to inactivate the organisms and not over approximately ten seconds in a film not over 1 millimeter thick, in which the irradiated energy between 2000 Å. and 2600 Å. is not less than 10 milliwatts per square centimeter and the irradiated energy below 2000 Å. is not less than 1 milliwatt per square centimeter.

10. The method of treating a suspension of micro-organisms to inactivate the organisms without materially impairing the antigenic properties of the organisms, which comprises exposing the suspension to ultraviolet irradiation for a period of time sufficient to inactivate the organisms, and not over approximately 10 seconds in a film not over 1 millimeter thick, in which the irradiated energy between 2000 Å. and 2600 Å. is not less than 1 milliwatt per square centimeter and the irradiated energy below 2000 Å. is not less than 0.1 milliwatt per square centimeter.

11. The method of treating a suspension of micro-organisms to inactivate the organisms without materially impairing the antigenic properties of the organisms, which comprises exposing the suspension to ultraviolet irradiation for a period of time sufficient to inactivate the organisms, and not over approximately 10 seconds in a film not over 1 millimeter thick in which the irradiated energy below 2000 Å. is not less than 0.1 milliwatt per square centimeter.

12. The method of treating a suspension of micro-organisms to inactivate the organisms without materially impairing the antigenic properties of the organisms, which comprises exposing the suspension to ultraviolet irradiation for a period of time sufficient to inactivate the organisms, and not over 1 second in a film not more than 1 millimeter thick in which the irradiated energy between 2000 Å. and 2600 Å. is not less than 1 milliwatt per square centimeter and the irradiated energy below 2000 Å. is not less than 0.1 milliwatt per square centimeter.

13. A vaccine of high potency having antigenic properties substantially equal to those of an untreated suspension of the organisms comprising a sterile suspension of organisms which has been subjected to ultraviolet irridation for a period of less than approximately 10 seconds by a lamp having an ultraviolet output of not less than 1 milliwatt per square centimeter of energy between 2000 Å. and 2600 Å. and not less than 0.1 milliwatt per square centimeter of energy below 2000 Å.

14. A vaccine of high potency having antigenic properties substantially equal to those of an untreated suspension of the organisms comprising a sterile suspension of organisms which has been subjected to ultraviolet irradiation for a period of less than approximately 10 seconds by a lamp having an output of not less than 0.1 milliwatt per square centimeter of energy below 2000 Å.

15. The method of treating a suspension of micro-organisms without materially impairing the antigenic properties of the organisms, which comprises exposing the suspension to ultraviolet irradiation for a period of time sufficient to inactivate the organisms and not over approximately 10 seconds, in a flowing, uniform film not over 1 millimeter in thickness, in which the irradiated energy under 2600 Å. is not less than 10 milliwatts per square centimeter.

SIDNEY O. LEVINSON.
FRANZ OPPENHEIMER.

REFERENCES CITED

The following references are of record in the file of this patent:

UNITED STATES PATENTS

| Number | Name | Date |
|---|---|---|
| 1,683,877 | Edblom | Sept. 11, 1928 |

FOREIGN PATENTS

| Number | Country | Date |
|---|---|---|
| 598,680 | Germany | June 15, 1934 |
| 600,941 | Germany | Aug. 3, 1934 |
| 67,206 | Austria | Dec. 10, 1914 |